United States Patent [19]

Cavalli

[11] Patent Number: 4,535,604
[45] Date of Patent: Aug. 20, 1985

[54] MACHINE FOR MAKING ICE CREAM AND SIMILAR COLD PRODUCTS, HAVING A REMOVABLE ICE CREAM-MAKING VESSEL

[76] Inventor: Alfredo Cavalli, 9, Via Galileo Galilei, Pessano Con Bornago (Milan), Italy

[21] Appl. No.: 610,766

[22] Filed: May 16, 1984

[30] Foreign Application Priority Data

May 19, 1983 [IT] Italy ............................. 21185 A/83

[51] Int. Cl.³ ............................................. A23G 9/00
[52] U.S. Cl. .................................... 62/342; 165/136; 165/169
[58] Field of Search .................. 62/342, 343; 165/136, 165/169; 219/311, 535

[56] References Cited

U.S. PATENT DOCUMENTS

| | | | |
|---|---|---|---|
| 2,367,368 | 1/1945 | Osterheld | 219/535 |
| 2,637,530 | 5/1953 | Janos | 165/136 |
| 2,801,321 | 7/1957 | Prindle | 219/311 X |
| 3,335,789 | 8/1967 | Raskin | 165/169 X |
| 3,358,118 | 12/1967 | Mather et al. | 219/311 |
| 3,553,976 | 1/1971 | Cumine et al. | 165/169 X |
| 3,912,907 | 10/1975 | Lodi | 219/535 |
| 4,206,805 | 6/1980 | Beckett | 165/169 X |
| 4,213,498 | 7/1980 | Vandenbossche | 165/169 X |
| 4,429,549 | 2/1984 | Randolphi | 62/342 |

Primary Examiner—William E. Tapolcai
Attorney, Agent, or Firm—Cohen, Pontani & Lieberman

[57] ABSTRACT

An ice cream-making machine with an ice cream-making vessel which can be inserted in and removed from a substantially cylindrical cooling chamber with a circular cross-section that is not completely closed on itself due to the presence of a slot extending along a generatrix of the cylinder. The side wall of the chamber includes an outer layer, a stratum of elastically-yielding material, ducts for circulating a refrigerant fluid, and means for enlarging the chamber by opening the slot against resilient means to allow the insertion or removal of the ice cream-making vessel. Thus, effective contact between the ducts for circulating the refrigerant fluid and the ice cream-making vessel is always ensured and the performance of the machine is optimized.

4 Claims, 5 Drawing Figures

MACHINE FOR MAKING ICE CREAM AND SIMILAR COLD PRODUCTS, HACING A REMOVABLE ICE CREAM-MAKING VESSEL

The present invention relates to a machine for making ice cream and similar cold products, of the type having a removable ice cream-making vessel and including a support structure with a base housing surmounted by a substantially cylindrical cooling chamber for receiving the removable ice cream-making vessel.

In the following description and in the subsequent claims, the expression ice cream-making vessel is used to identify a container, generally of stainles steel, in which the chosen ingredients of the ice cream to be made are mixed by a special rotary tool with a scraping blade, the container being cooled externally by means of a suitable cooling circuit. Naturally, such a container, and also the cooling chamber in which it is adjustably locatable, may be cylindrical, conical or in the form of any other body of revolution, but just for the purpose of non-limiting example the following description and subsequent claims will refer only to a cylindrical container and respective cylindrical chamber.

In an ice cream-making machine, the removability of the ice cream-making vessel allows:

easy and rapid removal of the ice cream by simple overturning of the vessel;

easy, quick and thorough washing of the vessel, which, to advantage, may be carried out away from the electrical parts and/or other working parts of the ice cream-making machine;

very short down-times between two successive operating cycles, even when the ice cream-making machine has only one ice cream-making vessel.

Machines proposed and made up to now are of two basic types and, specifically, are machines in which the ducts for the coolant liquid constitute an upwardly-flared conical chamber into which and from which an ice cream-making vessel with the same conical taper can be inserted and removed. With regard to the taper, this is designed accurately to ensure an effective and essential contact between the duct portions and the outer wall of the ice cream-making vessel, but in practice the contact hardly occurs at all for a large number of these portions for a combination of technical and technological reasons such as: small manufacturing errors in the ducts, deformability of the material (generally copper) from which the ducts are formed and hence the presence of deformations due to bumps or bashes, accidental pressure during assembly or use of the machine, slight yielding of the supports for the ducts, etc. It is known that, wherever good contact does not occur between the cooling ducts and the wall of the ice cream-making vessel, frost or ice forms and results in a considerable loss of frigories (a clear deterioration in performance).

In another type of ice cream-making vessel machine, the cooling ducts surround an auxiliary receptable containing brine in which the ice cream-making vessel is immersed. The disadvantages of this type of machine are linked particularly to the considerable constructional complexities, to sealing problems, to the requirements of careful maintenance and monitoring of the auxiliary receptable to prevent even the slightest loss of brine which could irreparably damage the working parts of the machine and, not least, the laborious handling required for operating it. The combination of all these disadvantages is such that machines of the type considered have found even more limited use in the industrial field.

The problem thus exists of overcoming the aforesaid disadvantage of the prior art by making available an ice cream-making machine with structural and functional characteristics such that, besides removability of the ice cream-making vessel, effective contact between all the portions of the cooling duct and the outer wall of the vessel is always ensured without in any way hindering the removability.

As a solution to this problem, the applicant has proposed a machine in which the ice cream-making vessel can be inserted into or removed from a cooling basket constituted by two halves which can be opened to receive the vessel and can be clamped around it. The cooling coil which constitutes the basket can yield resiliently in a direction radially of the basket itself.

The object of the present invention is to provide a machine which solves the aforesaid problem while ensuring a better thermal efficiency with a more compact structure than that already proposed.

This object is achieved, according to the present invention, by a machine of the said type, which is characterised in that at least the side wall of the chamber has a circular cross-section which is not completely closed on itself due to the presence of a slot extending along a generatrix, and includes an outer substantially cylindrical layer, a stratum of elastically-yielding material fixed inside the layer, ducts for circulating the refrigerant fluid fixed within the stratum, and means from for enlarging the chamber by widening the slot against resilient means.

To advantage, the chamber is mounted on the base housing by means of a first vertical pin located in correspondence with the slot and a second vertical pin located in a diametrally opposite position.

An ice cream-making machine according to the invention is further characterised in that the resilient means are constituted by the said layer, which is made of spring steel.

The more considerable advantages achieved by the machine of the invention are:

the ease and rapidity with which the ice cream-making vessel can be inserted into and removed from the respective chamber, the cooling chamber being kept enlarged. Consequently, it is possible to achieve a combination of all the advantages relating to the removability of the ice cream-making vessel.

the effective contact which is always ensured between each cooling duct and the outer wall of the ice cream-making vessel. In fact, such a contact is ensured by the resilient reaction of the layer on each duct passing through the stratum of yielding material.

Further characteristics and advantages will become clearer from the description of one embodiment of an ice cream-making machine according to the invention, which follows with reference to the appended drawings given purely by way of non-limiting example.

Figure 1:
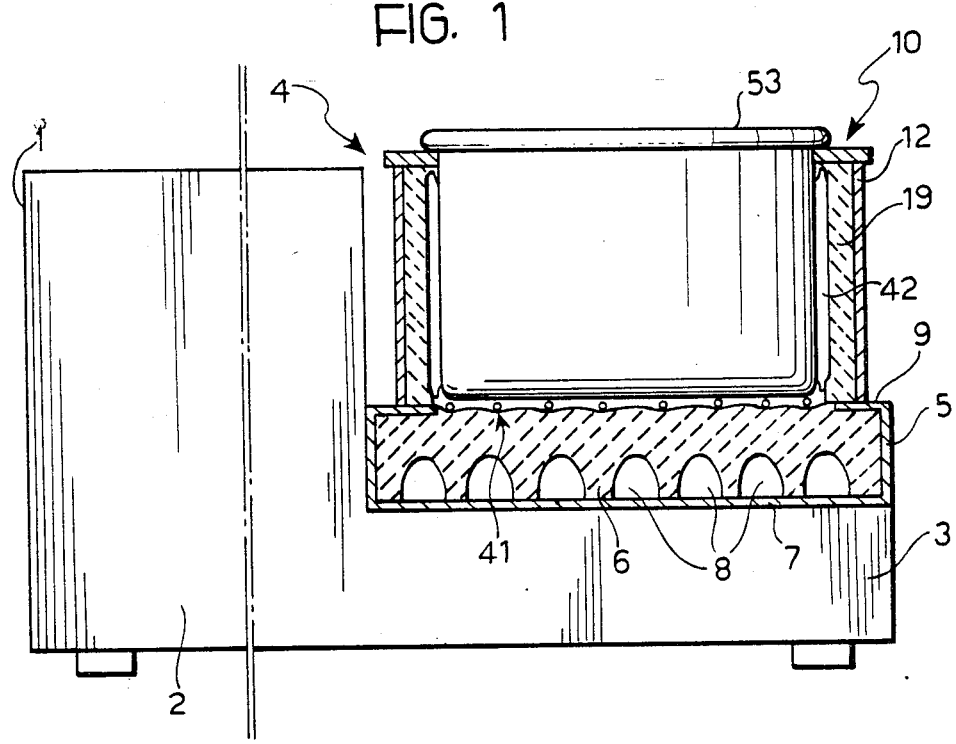
FIG. 1 is a schematic vertical sectional view of an ice cream-making machine according to the present invention.
Figure 2:
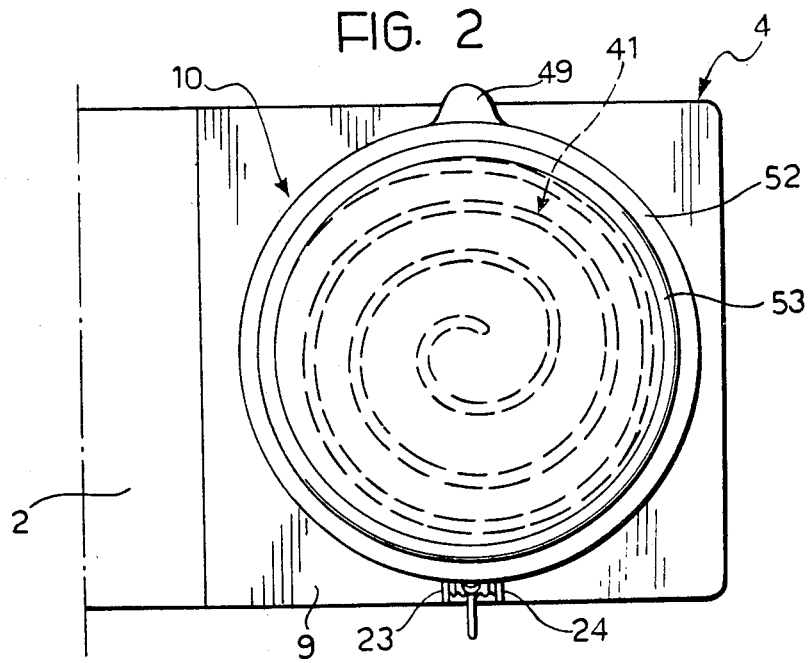
FIG. 2 is a plan view of the machine of FIG. 1 in an operating condition.
Figure 3:
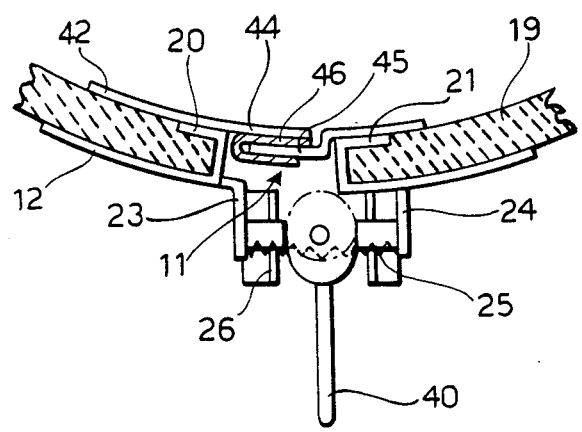
FIG. 3 shows a detail of the machine illustrated in FIG. 2 on an enlarged scale.
Figure 4:
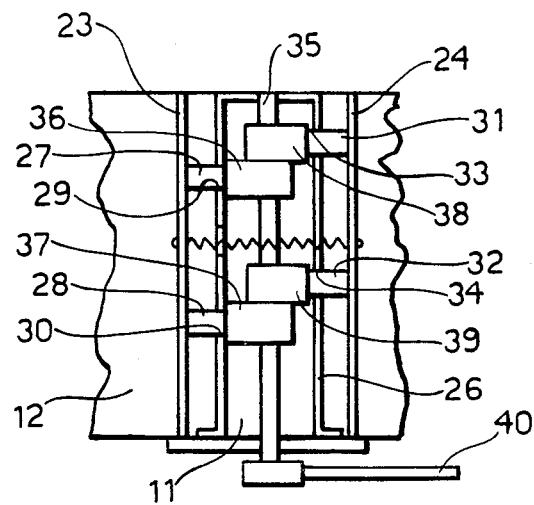
FIG. 4 shows a detail of the machine illustrated in FIG. 2 on an enlarged scale.
Figure 5:
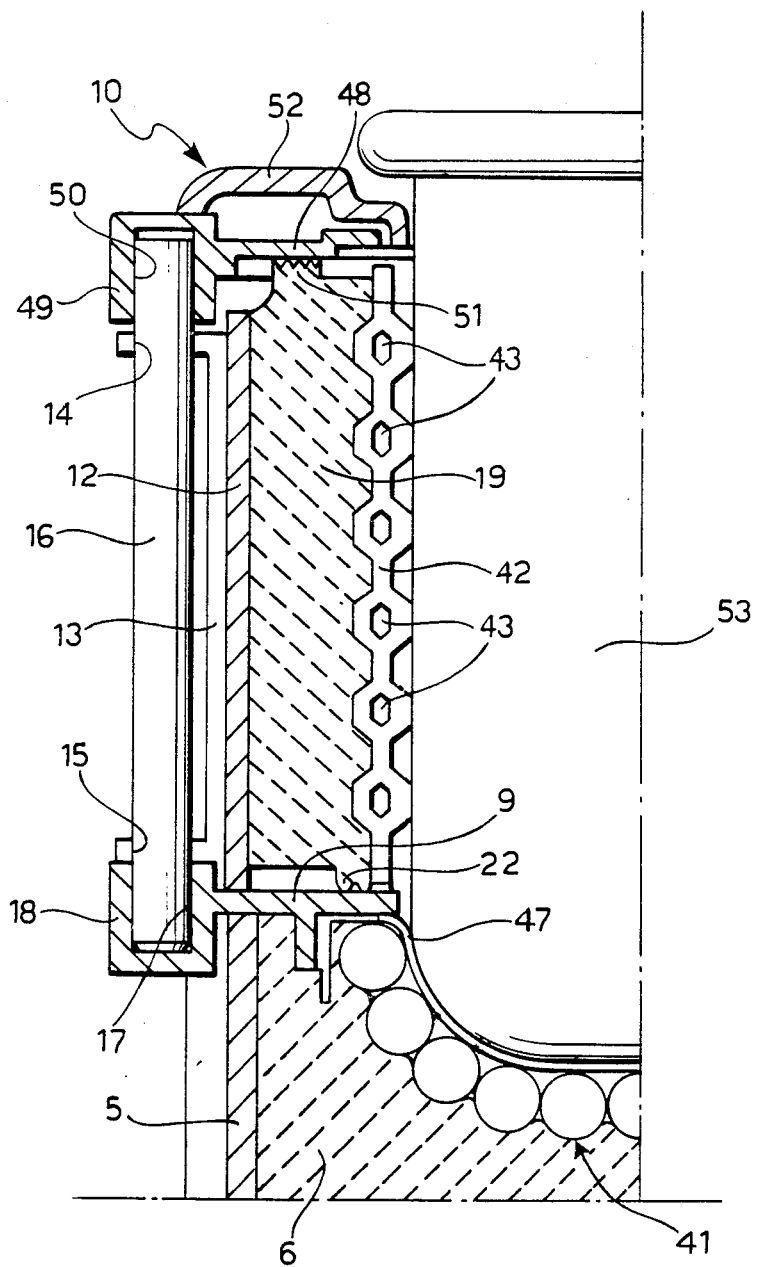
FIG. 5 shows a detail of the machine illustrated in FIG. 1 on an enlarged scale.

With reference to the drawings, the body of a support casing of an ice cream-making machine according to the invention is generally indicated 1. A portion 2 of this casing body 1 is intended to receive, for example, a conventional cooling system, not shown, and possibly drive members for rotating an ice cream-making blade, these also being conventional and therefore not shown. Laterally of the portion 2 the casing body 1 forms a plinth 3, also in the form of a casing, which houses and supports the working parts of the machine under consideration.

A support structure, generally indicated 4, is mounted on the plinth 3. According to a preferred but nonlimiting embodiment, the support structure 4 includes a parallelepiped-shaped base 5 to the plinth 3 and having a housing structure. The base housing 5 is upwardly open and contains a block 6 of yielding elastomeric material, preferably and for example rubber; to advantage, a plurality of substantially dome-shaped cavities 8 are formed in the lower face 7 to the block 6.

The top of the base housing 5 is partially closed by a flange 9 which has a substantially quadrangular outer edge and a circular inner edge.

The structure 4 includes a substantially cylindrical chamber 10. The side wall of the chamber 10 has a circular cross-section which is not completely closed on itself due to the presence of a slot 11 extending along a generatrix and located concentrically above the flange 9 with its axis vertical. The chamber 10 includes an outer layer 12 which is resiliently deformable and is preferably made of spring steel.

In correspondence with a generatrix diametrally opposite the slot 11, a support 13 is fixed to the layer 12 by conventional means, such as screws, rivets or the like, not shown; the support 13 includes two circular holes 14 and 15 aligned on a vertical axis.

A vertical pin 16 is inserted in the holes 14, 15 and its lower end is engaged in a seat 17 formed in a projection 18 of the flange 9.

The chamber 10 is thus fixed to the flange 9 by the pin 16.

The chamber 10 also includes a stratum 19 of elastically-yielding material, preferably and for example rubber. This stratum 19 has a predetermined thickness and is fixed to the inside of the layer 12 with the aid of edges 20 and 21 of the layer 12 located in correspondence with the slot 11 and bent inwardly. The lower edge of the stratum 19 is in contact with the flange 9 by means of a notched zone 22 which may move on the flange 9 without excessive friction.

Again in correspondence with the slot 11, the layer 12 includes edges 23 and 24 bent radially outwardly and constituting bearing members in a tangential sense. The edges 23 and 24 are urged resiliently towards each other by resilient means constituted by the layer 12, which tends to close, and possibly by an auxiliary spring 25 stretching across the slot 11 between the edges 23 and 24.

On the opposite side of the flange 9 from the projection 18, there is rigidly mounted a frame 26 which is thus inserted between the edges 23 and 24 of the layer 12 in correspondence with the slot 11.

The frame 26 supports a plurality of small pushers housed in respective seats and guided for movement therein towards and away from the edges 23 and 24; for example, according to the preferred embodiment illustrated in the drawings, the frame 26 includes two pushers 27, 28 housed in respective seats 29, and movable towards and away from the edge 23, and two pushers 31, 32 housed in respective seats 33, 34 and movable towards and away from the edge 24. The elements indicated 26 to 40 constitute means for enlarging the chamber 10 by widening the slot 11 against the resilient reaction of the layer 12 and/or the spring 25; these thus allow the chamber 10 to be enlarged (opened) or otherwise (closed).

The frame 26 also supports a vertical pin 35 on which respective control cams are keyed in correspondence with each pusher; according to the preferred embodiment illustrated, the pin 35 carries four cams 36, 37 38, 39 located in correspondence with the pushers 27, 28, 31, 32 respectively.

The pin 35 is angularly displaceable in the frame 26 under the action of drive means, for example a manually-operable lever 40 rigid with the pin 35.

The block 6 and the stratum 19 support ducts for the circulation of refrigerant fluid; these ducts may be of different types and with different paths: for example, according to one preferred embodiment illustrated in the drawings, the block 6 supports a coil 41 arranged substantially in a spiral while, within the chamber 10, the stratum 19 supports a plate 42 of the type commonly known by the name "roll-bond", which, as is known, has a series of ducts 43 formed directly by molding. The coil 41 is fixed conventionally to the block 6, for example, by being embedded in the rubber of the block 6. The "roll-bond" 42 is rigid with the chamber 10, being fixed to the edges 20 and 21 by conventional means such as, for example, screws, rivets or the like, not shown. In correspondence with the slot 11, the "roll-bond" 42 terminates with two lips 44 and 45 which are superimposed and separated by a gasket 46.

To advantage, the top of the coil 41 is protected by a plate 47, preferably of copper and of a very small thickness, connected to the flange 9.

The top of the structure 4 is closed by two annular flanges: a first flange 48 provided with a projection 49 in which a seat 50 is formed for receiving the pin 16 and bearing on a notched zone 51 of the stratum 19, and a second closing flange 52 located above the flange 48.

In the drawings, a substantially cylindrical ice cream-making vessel used in the machine according to the invention is indicated 53. This vessel 53 has an outer diameter which is between the inner diameter of the chamber 10 when it is closed and the inner diameter of the chamber 10 when it is open. Hence, when the chamber 10 is closed, the "roll-bond" 42 presses on the vessel 53 and clamps it, while there is a substantial gap between the "roll-bond" 42 and the vessel 53 when it is open, which allows the vessel 53 to be withdrawn (or inserted).

The operation of the machine of the invention described above is as follows.

In an initial condition, the cooling chamber 10 is in an open condition, a condition achieved by moving the lever 40 angularly about the vertical pin 35; so that the cams 36, 37, 38, 39 thrust the respective pushers 27, 28, 31, 32 to open the slot 11 and thus enlarge the chamber 10.

The ice cream-making vessel 53 can now be inserted easily in the cooling chamber 10 and, when it is completely inserted, it rests on the plate 47 while its lateral surface is essentially not in contact with the inner wall of the chamber 10.

Once insertion is complete, the lever 10 is again operated, allowing the slot 11 to close so that the chamber 10 is in its closed condition. Since, in the closed condition, the inner wall of the cooling chamber 10 has a smaller diameter than the outer diameter of the ice cream-making vessel 53, the "roll-bond" 42 achieves true and proper encircling of the ice cream-making vessel itself. Furthermore, if account is taken of the presence of the stratum 19 of elastically-yielding material on which the "roll-bond 42" is mounted, the resilient reaction due to the layer 12 and/or the spring 25 is distributed uniformly over the various ducts 43 constituting the "roll-bond", thus ensuring effective contact between each duct 43 and the outer wall of the ice cream-making vessel 53.

It should be noted that, for better cooling of the base of the vessel 53, the cooling fluid is passed through a coil which is costlier but more effective than the "roll-bond". In order to improve the heat exchange between the vessel 53 and the coil 41, the copper plate 47 is interposed therebetween and, given its small thickness, is plastically deformable so that it easily adapts to the surfaces in contact; this contact is further improved by the cavities 8 in the rubber block 6, which make it softer.

It should also be noted that the interposition of the pushers 27, 28, 31, 32 between the cams 36, 37, 38, 39 and the edges 23, 24 prevents the direct sliding of the cams on the edges, which could cause rubbing of the chamber 10 because of frictional forces.

I claim:

1. A machine for making ice cream and similar cold products comprising a removable ice cream making vessel, a support structure with a base housing, and a substantially cylindrical cooling chamber mounted on said base housing for receiving said removable ice cream making vessel, said cooling chamber having a side wall, at least said side wall of said cooling chamber having a circular cross-section which is incompletely closed on itself whereby it defines a slot extending along a generatrix, said side wall including an outer substantially cylindrical resiliently deformable layer, a stratum of elastically yielding material fixed inside said layer, ducts for circulating refrigerant fluid fixed within said stratum, and means for enlarging said cooling chamber by widening said slot against the resilient reaction of said outer layer, said cooling chamber being mounted on said base housing by means of a first vertical pin located in correspondence with said slot and a second vertical pin in a position diametrically opposite said first pin.

2. A machine as defined in claim 1, wherein said layer is made from spring steel.

3. A machine as defined in claim 1, wherein said means for enlarging the cooling chamber include a plurality of cams keyed onto said first pin and acting, within said slot, on said layer, said first pin being rotatably mounted on said base housing.

4. A machine as defined in claim 3, wherein a framework is fixed to said base housing and wherein a respective pusher is interposed in the slot between each said cam and said layer, said pushers being guided for movement in said framework.

* * * * *